Mar. 6, 1923.                                              1,447,911
               W. T. TRAVIS ET AL
      GRADING MECHANISM FOR POTATO HARVESTERS
                Filed July 22, 1921        5 sheets-sheet 5
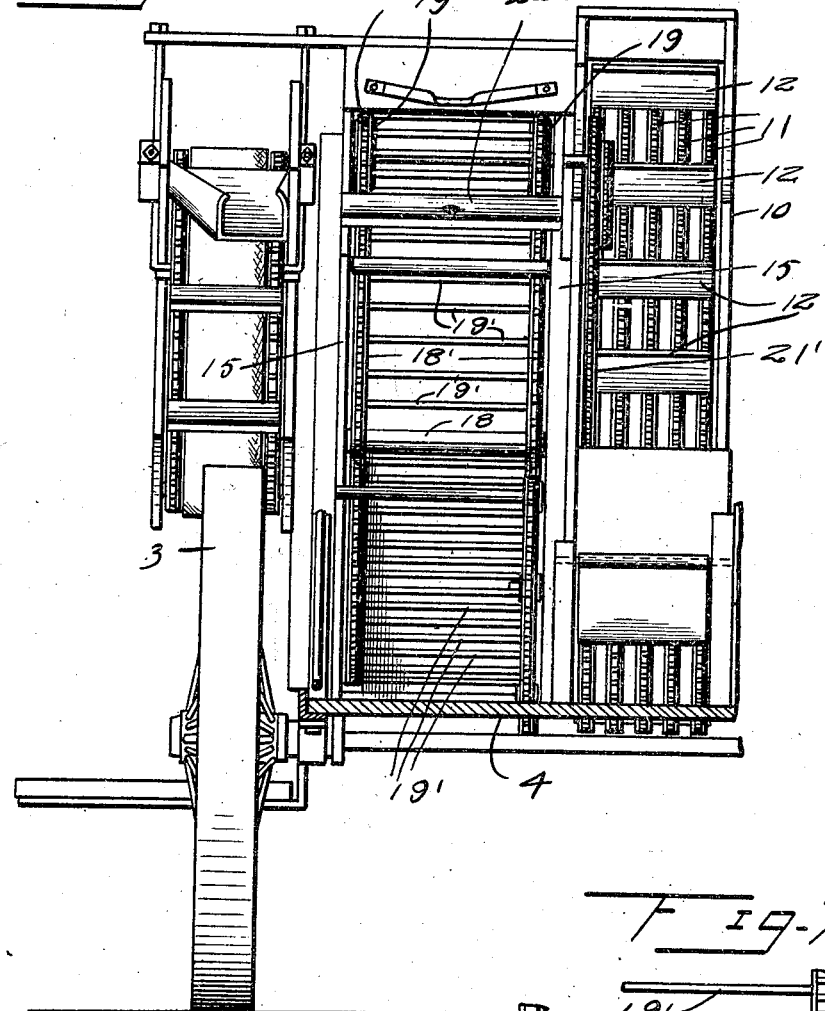
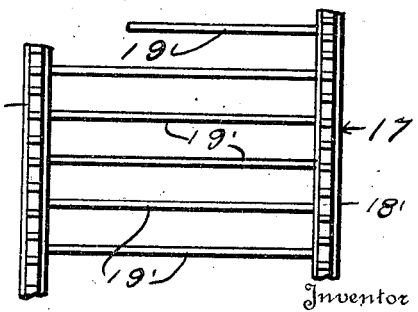

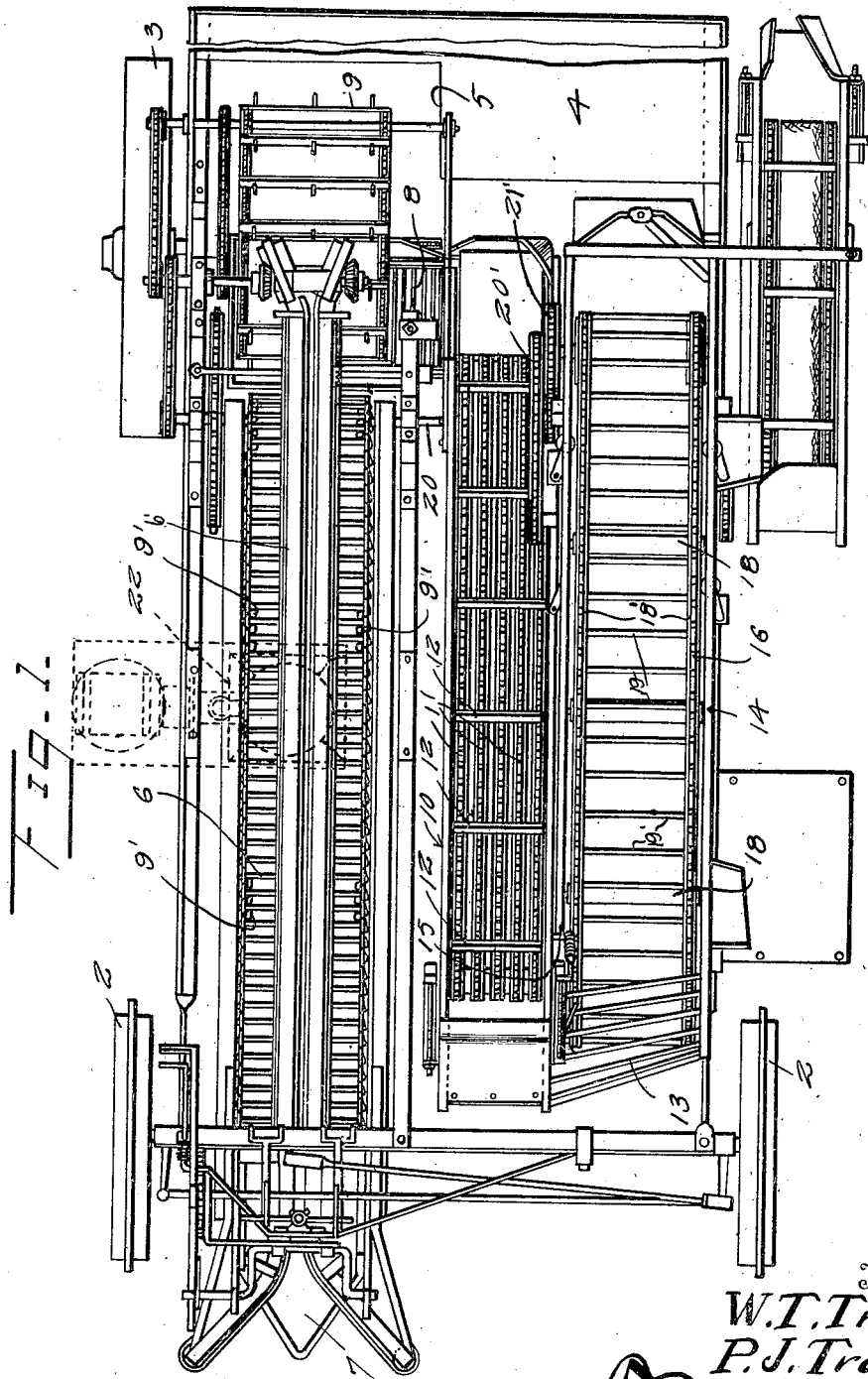

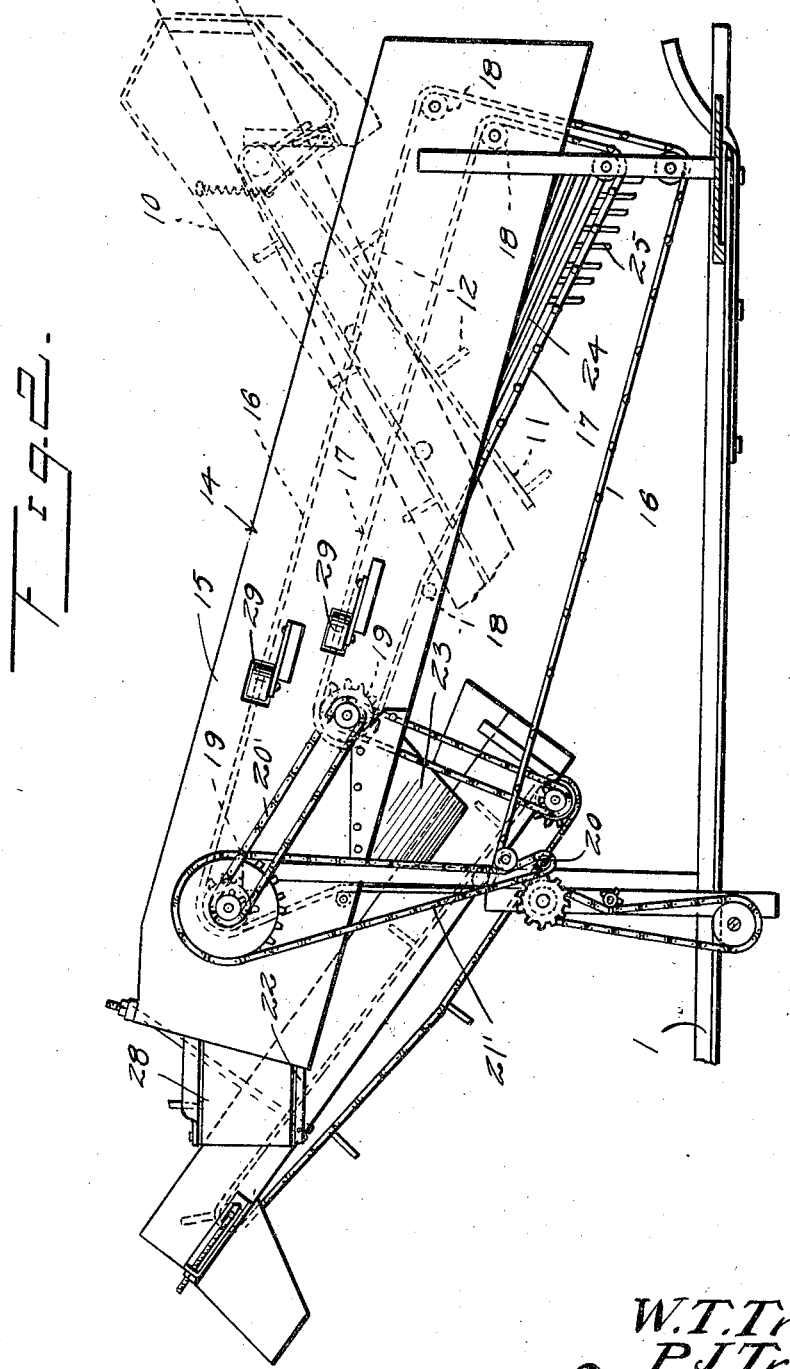

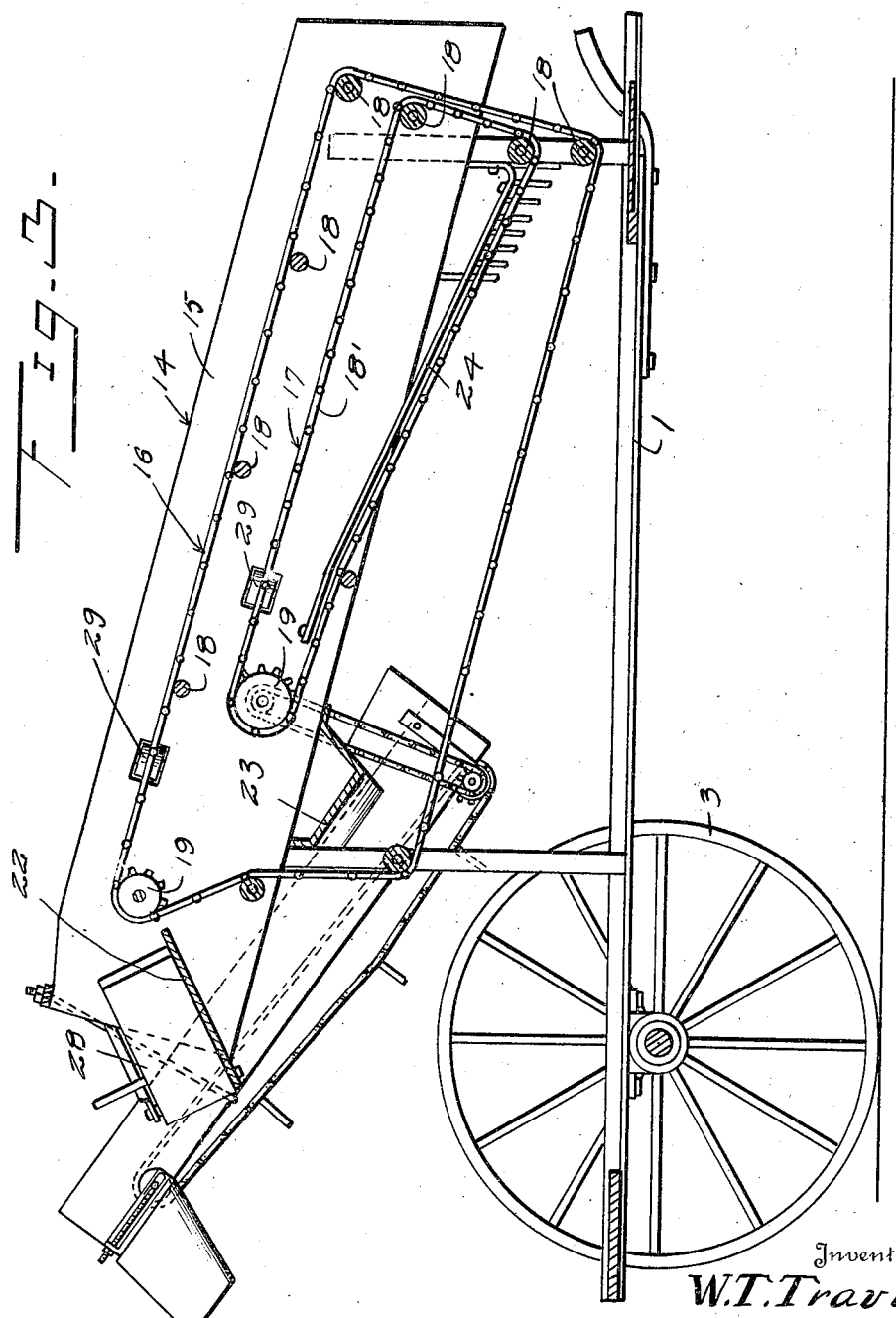

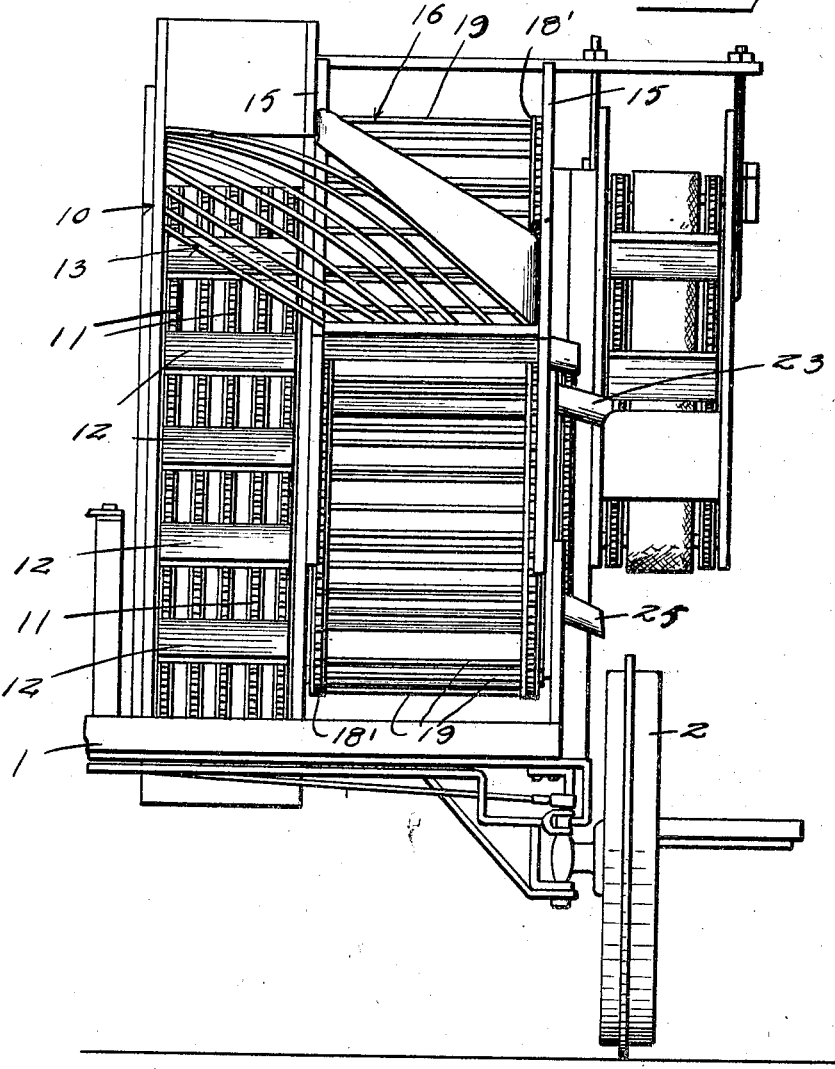

Patented Mar. 6, 1923.

1,447,911

UNITED STATES PATENT OFFICE.

WILLIAM T. TRAVIS AND PAUL J. TRAVIS, OF OYSTER, VIRGINIA.

GRADING MECHANISM FOR POTATO HARVESTERS.

Original application filed August 26, 1920, Serial No. 406,227. Divided and this application filed July 22, 1921. Serial No. 486,844.

*To all whom it may concern:*

Be it known that we, WILLIAM T. TRAVIS and PAUL J. TRAVIS, citizens of the United States, residing at Oyster, in the county of Northampton and State of Virginia, have invented certain new and useful Improvements in Grading Mechanism for Potato Harvesters; and we do hereby declare the following to be a full, clear, and exact description of the invention, such as will enable others skilled in the art to which it appertains to make and use the same.

This invention relates to new and useful improvements in potato harvesters, being a division of our application filed August 26th, 1920, and serially numbered 406,227 and has for its primary object the provision of a grading mechanism operating in conjunction with a digger and a cleaner for separating the potatoes after being cleaned into several sizes and to deliver said potatoes into separate receptacles or containers.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a top plan view, illustrating a grading mechanism for a potato harvester constructed in accordance with my invention, Figure 2 is a fragmentary side elevation partly in section illustrating the grading mechanism, Figure 3 is a sectional view illustrating the same, Figure 4 is a fragmentary end elevation illustrating a chute between the cleaner and the grader, Figure 5 is a fragmentary transverse sectional view, illustrating the potato discharge, Figures 6 and 7 are detail views, illustrating the grading aprons.

Referring in detail to the drawings, the numeral 1 indicates a supporting frame mounted upon front and rear wheels 2 and 3 and the former wheels are so connected to the frame that they are capable of turning about a vertical axis for the purpose of steering. The frame 1 extends rearwardly of the rear wheels 3 for the purpose of providing a platform 4 on which the operator may stand. The platform 4 is equipped with a vine receiving opening 5 for the purpose of permitting vines of potatoes discharged from the harvester to fall onto the ground or if desired may be collected in a suitable receptacle (not shown) placed under the opening 5.

An upwardly and rearwardly inclined conveyor 6 is located at one side of the frame 1, and has associated with its forward end a digger 7 adapted to remove potatoes from the ground on the forward motion of the machine and deposit the potatoes with their vines onto the conveyor 6 whence they are carried rearwardly and deposited onto a transverse conveyor 8. A main vine conveyor 6' is disposed over the conveyor 6 to carry the vines rearwardly and is provided at its rear end with a cutter bar 9' to separate the potatoes from the vines and the potatoes fall onto a transverse conveyor 8 and the vines are caught by an upwardly and rearwardly inclined conveyor 9 and deposited into the opening 5 of the platform 4 permitting them to accumulate within a receptacle if one is used or to fall onto the ground if no receptacle is provided. The conveyor 6 during its rotation is given a vibratory motion by means of vibrating rollers 9' carried by the frame 1 so as to loosen the dirt from the potatoes and also to cause said potatoes to become separated from the vines. The potatoes are deposited into a cleaner 10 which inclines upwardly and forwardly on the frame 1 and the cleaner consists of an endless conveyor 11 provided with flights 12. The potatoes traveling with the conveyor 11 become separate from the dirt that may be adhering thereto and the dirt falls through the conveyor onto the ground and the potatoes are deposited into a transverse chute 13. The conveyor 11 consists of a plurality of relative spaced endless chains connected by the flights 12.

A grading device 14 is mounted on the frame 1 adjacent to the cleaner 10 and receives the potatoes from the transverse chute 13. The grader 14 includes side walls 15 in which are mounted endless aprons 16 and 17 and the latter pass over rollers 18. The aprons include endless sprocket chains 18' that travel over sprocket wheels 19 and have secured thereto spaced rods 19'. The rods of the apron 16 are spaced further apart than the rods of the apron 17 so that the large size potatoes will be carried rearwardly by the apron 16 while the smaller size potatoes fall through onto the apron 17. The smallest size potatoes fall through the apron 17 and the intermediate size of potatoes are carried rearwardly by said apron 17. The shafts that support the sprocket wheels are connected together by an endless sprocket chain 20' and one of said shafts is driven from a power shaft 20 by an endless sprocket chain 21'. The power shaft 20 also drives the cleaner and the conveyor by suitable gearing and sprocket chains and the power shaft receives its rotation from a power source 21, located upon the frame 1. The apron 16 is of a larger mesh than the apron 17 so that the largest size potatoes are carried forward by the apron 16 and deposited in a chute 22 while the smaller size potatoes fall through the apron 16 onto the apron 17. The intermediate size potatoes are carried forward by the apron 17 and deposited into a chute 23 while the smallest size potatoes fall through the apron 17 onto a collecting board or pan 24 which leads to a chute 25. The chute 25 may have associated therewith a receptacle for receiving the smallest size potatoes. The largest size potatoes are received by the chute 22 and may be deposited into a receptacle. The intermediate size potatoes are received by the chute 23 and deposited onto a conveyor 26 which carries the potatoes to a chute 27 located adjacent the chute 22 and over the platform whence they may be deposited into a receptacle. The pan or board 24 may be constructed from a series of relatively spaced rods for the purpose of permitting the dirt that may still adhere to the potatoes and during the movement of the potatoes over the board to become separated from the potatoes and fall onto the ground.

The chute 22 has arranged therein a manually controlled gate 28 and is provided with a double discharge end so that the potatoes can be directed to pass out of one of the discharge ends and then the other.

From the foregoing description taken in connection with the accompanying drawings, it will be noted that after the potatoes have been dug from the ground and separated from the vines and also the dirt, that they may be graded into several sizes and discharged to different receptacles which may be in the form of sacks or any other type of container for shipment, and obviates the necessity of manually assorting the potatoes after they have been dug and separated from their vines.

The side boards of the grading device are provided with rollers 29 which the aprons engage for cooperating with the rollers 18 in causing the aprons to properly pass between said side boards with the minimum amount of friction.

While we have shown and described the preferred embodiment of our invention it will be understood that minor changes in construction, combination and arrangement of parts may be made without departing from the spirit and scope of the invention as claimed.

Having thus described our invention what we claim is:—

A grading mechanism having spaced upstanding inclined walls, a front pair and a rear pair of frame members supporting said walls and arranged with the pairs adjacent opposite ends thereof, rollers spanning said side walls, rollers spanning the pairs of frame members, a shaft journaled in said side walls having a sprocket wheel thereon, an endless grading apron traversing said rollers and sprocket wheel, a discharge chute intermediate the side walls and at the rear of the apron, the apron being trained to travel downwardly and forwardly after discharging its contents into said chute, an endless grading apron of finer mesh than and completely enclosed by said first mentioned grading apron, rollers spanning said side walls and front pair of frame members, a shaft spanning the said side walls and having a sprocket wheel thereon, said second grading apron passing over the second mentioned rollers and said mentioned sprocket wheel, the rear end of the second grading apron terminating short of the adjacent run of the first grading apron, a chute below the rear end of the second grading apron secured to the rear pair of frame members and to the lower edge portions of said side members and disposed below said side members, a pan within the second mentioned apron of substantially the same length as and relatively close to the lower run of the second mentioned apron, said pan being secured at its rear end portion intermediate said side walls and at its front end portion extending below said side wall and having an upstanding end secured to the front pair of said frame members, the second mentioned apron passing between one of said rollers and the pan to maintain the second mentioned apron relatively close to the under surface of the pan so that it will constitute a guide for the second mentioned apron, and means operable to drive said shaft.

In testimony whereof we affix our signatures in presence of two witnesses.

WILLIAM T. TRAVIS.
PAUL J. TRAVIS.

Witnesses:
  OTHO F. MEARS,
  BENJ. W. MEARS.